(12) United States Patent
Kozuka et al.

(10) Patent No.: US 9,832,506 B2
(45) Date of Patent: Nov. 28, 2017

(54) AV SIGNAL TRANSMISSION AND RECEIVING SYSTEM, SINK APPARATUS, AV SIGNAL TRANSMISSION AND RECEIVING METHOD, AND AV SIGNAL RECEIVING METHOD

(71) Applicant: Panasonic Intellectual Property Management Co., Ltd., Osaka (JP)

(72) Inventors: Masayuki Kozuka, Osaka (JP); Naoshi Usuki, Kyoto (JP); Toshiroh Nishio, Osaka (JP); Satoshi Takahashi, Osaka (JP); Takahiro Nishi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/504,823

(22) PCT Filed: Aug. 18, 2015

(86) PCT No.: PCT/JP2015/004084
§ 371 (c)(1),
(2) Date: Feb. 17, 2017

(87) PCT Pub. No.: WO2016/072037
PCT Pub. Date: May 12, 2016

(65) Prior Publication Data
US 2017/0280184 A1 Sep. 28, 2017

Related U.S. Application Data

(60) Provisional application No. 62/075,395, filed on Nov. 5, 2014.

(30) Foreign Application Priority Data

Mar. 27, 2015 (JP) .................................. 2015-067661

(51) Int. Cl.
*H04N 5/44* (2011.01)
*H04N 5/38* (2006.01)
(Continued)

(52) U.S. Cl.
CPC ............ *H04N 21/40* (2013.01); *G11B 27/031* (2013.01); *H04N 5/44* (2013.01); *H04N 7/04* (2013.01); *H04N 5/4401* (2013.01)

(58) Field of Classification Search
CPC ............ H04N 21/40; H04N 21/43635; H04N 21/436; H04N 21/43615; H04N 5/44;
(Continued)

(56) References Cited

U.S. PATENT DOCUMENTS

| | | | |
|---|---|---|---|
| 2009/0027405 A1 | 1/2009 | Kaga | |
| 2014/0003794 A1 | 1/2014 | Hoshino et al. | |
| 2014/0240604 A1* | 8/2014 | Toba | H04N 21/43635 348/723 |

FOREIGN PATENT DOCUMENTS

| | | |
|---|---|---|
| JP | 2009-33446 | 2/2009 |
| JP | 2010-28552 | 2/2010 |
| JP | 2014-11734 | 1/2014 |

OTHER PUBLICATIONS

International Search Report dated Oct. 13, 2015 in corresponding International Application No. PCT/JP2015/004084.
(Continued)

*Primary Examiner* — Sherrie Hsia
(74) *Attorney, Agent, or Firm* — Wenderoth, Lind & Ponack, L.L.P.

(57) ABSTRACT

An AV signal transmission and receiving system capable of appropriately receiving an AV signal includes a source apparatus and a sink apparatus connected to the source apparatus via an HDMI (registered trademark) cable. The sink apparatus includes: an AV signal receiving unit which receives an AV signal via the HDMI cable; a memory which
(Continued)

holds the EDID; a rewriting unit which rewrites the EDID; an HPD control unit which controls output of an HPD signal; and a determining unit which: determines whether the AV signal which has been received is an HDMI signal conforming to an HDMI standard or a digital visual interface (DVI) signal; and when the determining unit determines that the AV signal is a DVI signal, instructs the rewriting unit to rewrite the EDID and instructs the HPD control unit to output the HPD signal indicating that reading of the EDID which has been rewritten is possible.

12 Claims, 9 Drawing Sheets

(51) Int. Cl.
*H04N 21/40* (2011.01)
*H04N 7/04* (2006.01)
*G11B 27/031* (2006.01)

(58) Field of Classification Search
CPC .......... H04N 7/04; H04N 5/4401; H04N 5/38; G11B 27/031
USPC .... 348/723, 725; 725/85, 98, 100, 118, 131, 725/139, 148, 151
See application file for complete search history.

(56) References Cited

OTHER PUBLICATIONS

High-Definition Multimedia Interface, Specification Version 1.3a, HDMI Licensing, LLC, Nov. 10, 2006.
High-Definition Multimedia Interface, Specification Version 1.4a, Extraction of 3D Signaling Portion, HDMI Licensing, LLC, Mar. 4, 2010.

* cited by examiner

FIG. 4

| Period | Transmission data |
|---|---|
| Video Data | Video Pixels |
| | (Guard Band) |
| Data Island | Packet Data<br>-Audio Samples<br>-InfoFrames<br><br>HSYNC, VSYNC |
| | (Guard Band) |
| Control | Control<br>-Preamble<br>-HSYNC,VSYNC |

AV SIGNAL TRANSMISSION AND RECEIVING SYSTEM, SINK APPARATUS, AV SIGNAL TRANSMISSION AND RECEIVING METHOD, AND AV SIGNAL RECEIVING METHOD

TECHNICAL FIELD

The present disclosure relates to a system and a method for transmitting and receiving an AV signal between a source apparatus and a sink apparatus.

BACKGROUND ART

Conventionally, an AV signal transmission and receiving system which transmits and receives an AV signal between a source apparatus and a sink apparatus connected via a high-definition multimedia interface (HDMI) (registered trademark) cable has been proposed (see Non-patent Literature 1). In the AV signal transmission and receiving system, the source apparatus reads a capability of the sink apparatus from the sink apparatus, and transmits an AV signal according to the capability to the sink apparatus. In this way, the sink apparatus can reproduce video or audio with an image quality or a sound quality according to its own capability.

CITATION LIST

Non Patent Literature

[NPL 1]
High-Definition Multimedia Interface Specifical Version 1.3a Nov. 10, 2006

SUMMARY OF INVENTION

Technical Problem

The present disclosure provides an AV signal transmission and receiving system etc. capable of appropriately receiving an AV signal.

Solution to Problem

An AV signal transmission and receiving system according to the present disclosure is an AV signal transmission and receiving system including: a source apparatus; and a sink apparatus connected to the source apparatus via a high-definition multimedia interface (HDMI) (registered trademark) cable, wherein the source apparatus includes: a reading unit configured to read extended display identification data (EDID) from the sink apparatus via the HDMI (registered trademark) cable, the EDID being data indicating a capability of the sink apparatus; an analyzing unit configured to analyze the EDID which has been read; a transmission unit configured to transmit an AV signal to the sink apparatus via the HDMI (registered trademark) cable; and a control unit configured to instruct the transmission unit to transmit the AV signal according to a result of analyzing the EDID, and instruct the reading unit to read the EDID according to a hot plug detect (HPD) signal which is received from the sink apparatus via the HDMI (registered trademark) cable, and wherein the sink apparatus includes: a receiving unit configured to receive the AV signal via the HDMI (registered trademark) cable; a memory which holds the EDID; a rewriting unit configured to rewrite the EDID held in the memory; an HPD control unit configured to control output of the HPD signal; and a determining unit configured to: determine whether the AV signal which has been received is an HDMI (registered trademark) signal conforming to an HDMI (registered trademark) standard or a digital visual interface (DVI) signal conforming to a DVI standard; and when the determining unit determines that the AV signal is a DVI signal, instruct the rewriting unit to rewrite the EDID held in the memory, and instruct the HPD control unit to output the HPD signal indicating that reading of the EDID which has been rewritten is possible.

Advantageous Effects of Invention

The AV signal transmission and receiving system in the present disclosure is capable of appropriately receiving an AV signal.

BRIEF DESCRIPTION OF DRAWINGS

FIG. 4 is a diagram illustrating in detail data that is transmitted in Control, Data Island, and Video Data included in a TMDS period according to the embodiment.

DESCRIPTION OF EMBODIMENTS

Figure 1:
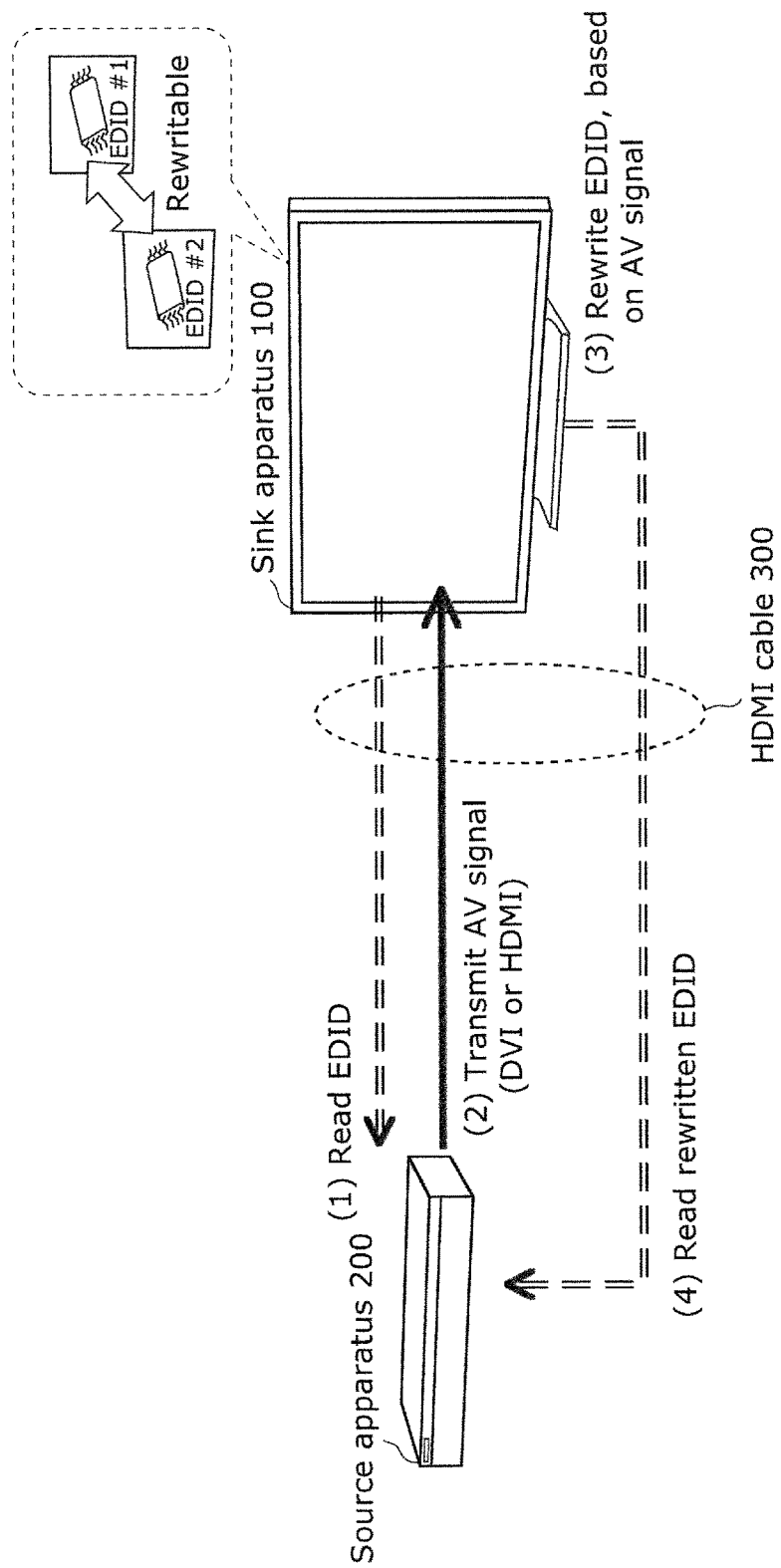
FIG. 1 is a configuration diagram illustrating a configuration of an AV signal transmission and receiving system according to an embodiment.

The Inventors found that the AV signal transmission and receiving system of Non-patent Literature 1 described in the Background Art section has problems below.

Normally, between a source apparatus and a sink apparatus connected via an HDMI (registered trademark) cable, the source apparatus firstly reads extended display identification data (EDID) in the sink apparatus, using a DDC line in the HDMI (registered trademark) cable. This EDID is data including a plurality of data blocks indicating a capability of the sink apparatus. For example, the EDID indicates whether a resolution of 1080p is possible, whether the 4K resolution is possible, whether 3D display is possible, whether 5.1ch audio is possible, etc.

Next, the source apparatus determines formats of video and audio to be transmitted, based on the read EDID. For example, the source apparatus determines the format of the video to be 3840×2160/60P/YCbCr 4:4:4/8 bit-depth. Alternatively, the source apparatus determines the format of the audio to be Linear Pulse Code Modulation (LPCM) 2ch or the like.

Next, the source apparatus transmits, to the sink apparatus, the AV signal indicating at least one of the video and audio having the determined format. At this time, the source apparatus transmits a signal property that is information related to the format of each of the video and audio, to the sink apparatus using an InfoFrame packet structure in a blinking period. The sink apparatus then reproduces and displays the received AV signal with reference to the InfoFrame information.

However, there is a case where a processor which analyzes the content of the read EDID in the source apparatus cannot correctly analyze part of data blocks in the EDID. This is caused by an analysis error, bug, or the like in the source apparatus.

For example, the source apparatus may transmit an unexpected different AV signal due to an analysis error etc. even when the EDID of the sink apparatus is described using a correct syntax. As a result, a problem of display quality occurs in the sink apparatus. For example, a DVI format signal (DVI signal) which does not include audio may be transmitted to the sink apparatus as an AV signal. In addition, an AV signal assigned with InfoFrame information which is interpreted as indicating as if the pixel encoding format were RGB although the pixel encoding format is actually YCbCr may be transmitted to the sink apparatus.

It is known that almost all of source apparatuses which cause such a problem transmit an AV signal as a DVI signal due to an analysis error on part of data blocks in EDID indicating a signal receiving capability of a sink apparatus even when the sink apparatus presents the capability of receiving an HDMI (registered trademark) signal.

In view of this, the sink apparatus according to the present disclosure determines whether a received AV signal is either an HDMI (registered trademark) signal conforming to an HDMI (registered trademark) standard or a DVI signal conforming to a DVI standard. When the sink apparatus determines that the AV signal is a DVI signal, the sink apparatus rewrites EDID held in a memory, and outputs an HPD signal indicating that reading of the EDID which has been rewritten is possible.

Hereinafter, embodiments are described in detail referring to the drawings as necessary. It should be noted that unnecessarily detailed explanation may not be provided. For example, well-known matters may not be explained in detail, and substantially the same constituent elements may not be repeatedly explained. Such explanation is omitted to prevent the following explanation from being unnecessarily redundant, thereby facilitating the understanding of a person skilled in the art.

The inventor(s) provides the attached drawings and following explanation to allow the person skilled in the art to fully appreciate the present disclosure, and thus the attached drawings and following explanation should not be interpreted as limiting the scope of the claims.

Embodiment

[1. Outline]

FIG. 1 is a configuration diagram illustrating a configuration of an AV signal transmission and receiving system according to an embodiment.

The AV signal transmission and receiving system 10 according to an embodiment includes a source apparatus 200 and a sink apparatus 100 connected to the source apparatus 200 via a high-definition multimedia interface (HDMI) (registered trademark) cable 300.

The source apparatus 200 is for example a video recording and reproducing apparatus, a personal computer, a DVD player, a BD recorder, or the like. The source apparatus 200 holds AV data indicating at least one of video and audio, and transmits the AV data as an AV signal.

The sink apparatus 100 is for example a TV receiver, a projector, or the like. The sink apparatus 100 receives the AV signal, and transmits the at least one of the video and audio represented by the AV signal.

The source apparatus 200 reads extended display identification data (EDID) of the sink apparatus 100 ((1) in FIG. 1), and transmits the AV signal according to the EDID to the sink apparatus 100 ((2) in FIG. 1).

The sink apparatus 100 rewrites the extended display identification data (EDID) according to whether an AV signal transmitted from the source apparatus 200 is an HDMI (registered trademark) signal or a DVI signal ((3) in FIG. 1). Subsequently, the source apparatus 200 reads the EDID which has been rewritten from the sink apparatus 100 ((4) in FIG. 1).

In this way, in an example case where the source apparatus 200 was not able to correctly analyze the EDID and transmitted the AV signal as a DVI signal, rewriting of the EDID and reading of the EDID which has been rewritten are executed. In other words, the EDID is rewritten by the sink apparatus 100, and the reading of the EDID which has been rewritten is executed by the source apparatus 200. As a result, in the case where the source apparatus 200 was able to correctly analyze the EDID which has been rewritten, it is possible to cause the source apparatus 200 to transmit the AV signal as an AV signal not as a DVI signal. In this way, the sink apparatus 100 can receive the AV signal appropriately.

[2. Configuration]

Hereinafter, an AV signal transmission and receiving system according to the embodiment is described in detail.

Figure 2:
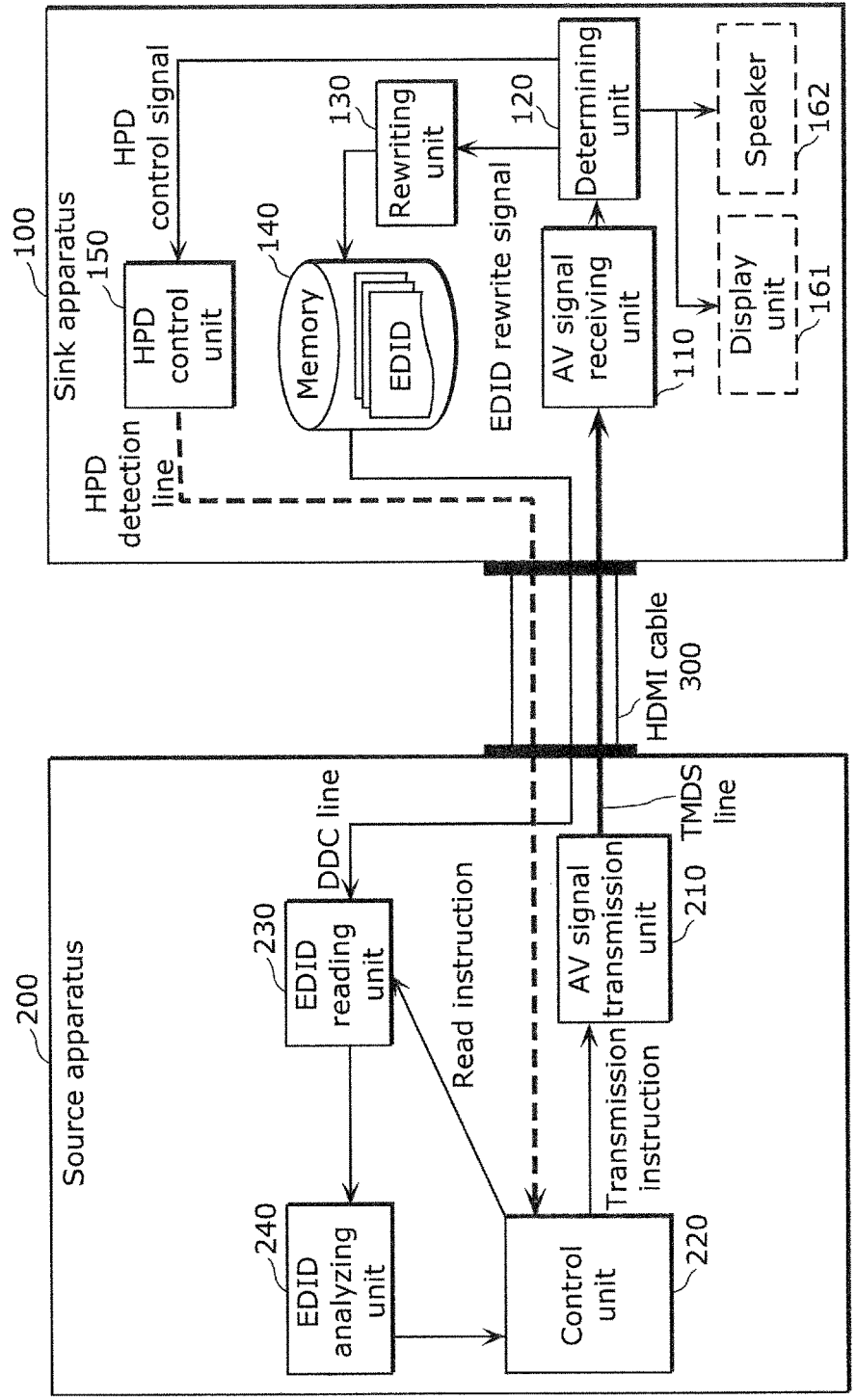
FIG. 2 is a block diagram illustrating a configuration of each of a source apparatus and a sink apparatus according to the embodiment.

FIG. 2 is a block diagram illustrating a configuration of each of the source apparatus 200 and the sink apparatus 100 according to the embodiment.

The source apparatus 200 includes an AV signal transmission unit 210, a control unit 220, an EDID reading unit 230, and an EDID analyzing unit 240.

According to a transmission instruction from the control unit 220, the AV signal transmission unit 210 transmits the AV signal to the sink apparatus 100 via a transition minimized differential signaling (TMDS) line included in the HDMI (registered trademark) cable 300.

According to a reading instruction from the control unit 220, the EDID reading unit 230 accesses a memory 140 of the sink apparatus 100 via a display data channel (DDC) line included in the HDMI (registered trademark) cable 300. Subsequently, the EDID reading unit 230 reads, via the DDC line, the EDID indicating a capability of the sink apparatus 100 stored in the memory 140.

The EDID analyzing unit 240 analyzes the EDID read by the EDID reading unit 230, and notifies the control unit 220 of the analysis result.

The control unit 220 instructs the AV signal transmission unit 210 to transmit the AV signal according to the result of analyzing the EDID. This instruction is given by means of the control unit 220 outputting the transmission instruction to the AV signal transmission unit 210.

Here, the control unit 220 may change the format of the AV signal to be transmitted from the AV signal transmission unit 210 according to the analysis result. The format is an HDMI (registered trademark) signal format conforming to the HDMI (registered trademark) standard, or a DVI signal format conforming to the digital visual interface (DVI) standard.

In other words, the control unit 220 may cause the AV signal transmission unit 210 to transmit the AV signal as an HDMI (registered trademark) signal, or cause the AV signal transmission unit 210 to transmit the AV signal as a DVI signal.

In addition, the control unit 220 monitors an output level of an HPD signal which is received from the sink apparatus 100 via a hot plug detect (HPD) line included in the HDMI (registered trademark) cable 300. When the output level of the HPD signal changes from Low to High, the control unit 220 instructs the EDID reading unit 230 to read the EDID. This instruction is given by means of the control unit 220 outputting the reading instruction to the EDID reading unit 230.

The sink apparatus 100 includes an AV signal receiving unit 110, a determining unit 120, a rewriting unit 130, the memory 140, and an HPD control unit 150.

The AV signal receiving unit 110 receives the AV signal transmitted from the source apparatus 200 via a TMDS line of the HDMI (registered trademark) cable 300.

The memory 140 is an EDID read only memory (ROM), and holds EDID.

The rewriting unit 130 rewrites the EDID held in the memory 140.

The HPD control unit 150 controls output of an HPD signal.

The determining unit 120 is configured as, for example, a TMDS decoder. The determining unit 120 determines whether the AV signal received by the AV signal receiving unit 110 is an HDMI (registered trademark) signal conforming to the HDMI (registered trademark) standard, or a DVI signal conforming to the DVI standard.

Here, when the determining unit 120 determines that the AV signal is a DVI signal, the determining unit 120 instructs the rewriting unit 130 to rewrite the EDID held in the memory 140. This instruction is executed by means of the determining unit 120 outputting an EDID rewriting signal to the rewriting unit 130. Furthermore, in this case, the determining unit 120 instructs the HPD control unit 150 to output an HPD signal indicating that reading of the EDID which has been rewritten is possible. This instruction is executed by means of the determining unit 120 outputting an HPD control signal to the HPD control unit 150.

In addition, when the AV signal is a DVI signal, the determining unit 120 reproduces video represented by the AV signal and causes the display unit 161 to display the video. On the other hand, when the AV signal is an HDMI (registered trademark) signal, the determining unit 120 reproduces video and audio represented by the AV signal, and causes the display unit 161 to display the video and causes the speaker 162 to output the audio.

Figure 3:
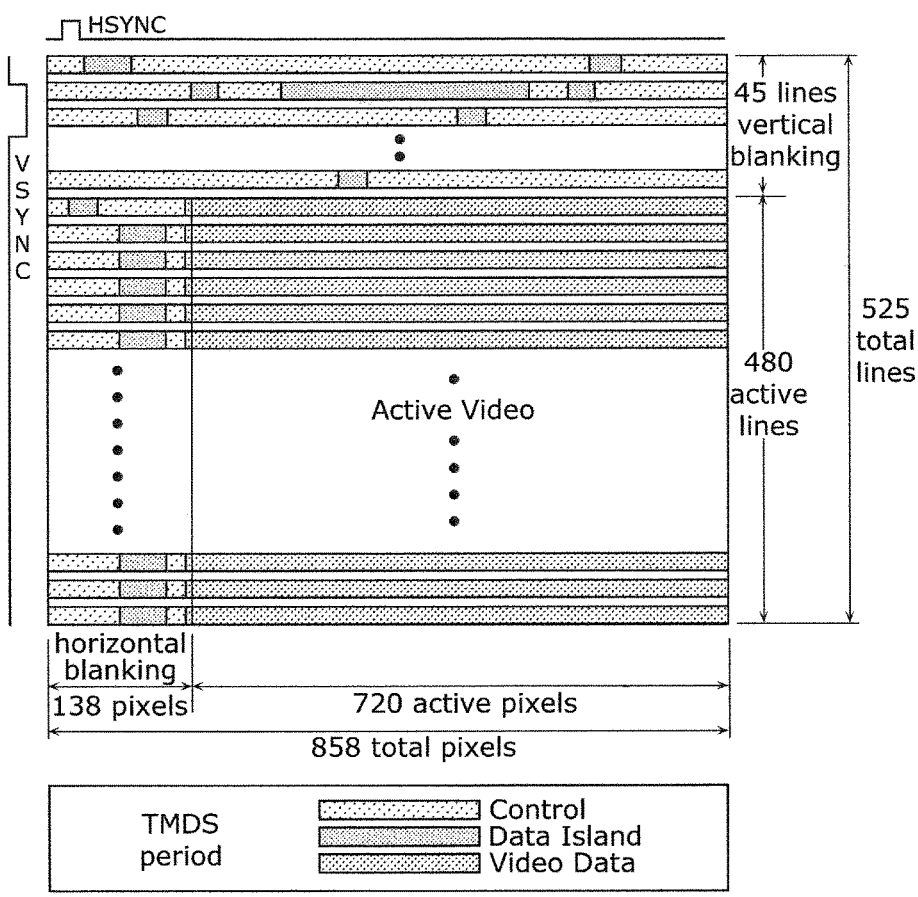
FIG. 3 is a diagram illustrating a structure of an HDMI (registered trademark) signal that is transmitted via a TMDS line according to the embodiment.

FIG. 3 is a diagram illustrating a structure of an HDMI (registered trademark) signal that is transmitted via a TMDS line.

The AV signal conforming to the HDMI (registered trademark) standard, that is, the HDMI (registered trademark) signal is transmitted in one of TMDS periods. The TMDS periods include Control, Data Island, and Video Data.

A video signal is transmitted to Video Data, a control signal is transmitted to Control, and an audio signal is transmitted to Data Island.

FIG. 4 is a diagram illustrating in detail data that is transmitted in Control, Data Island, and Video Data included in the TMDS periods.

As illustrated in FIG. 4, an audio signal (Audio Samples) is transmitted to Data Island, and AVI InfoFrame which is a signal indicating the mode of the AV signal is also transmitted to the Data Island. It is to be noted that AVI is an abbreviation of auxiliary video information. Furthermore, signals such as 10-bit signals called Guard Band for showing the boundaries of Data Island are transmitted immediately before and immediately after the Data Island.

In this way, the determining unit 120 determines that the AV signal is an HDMI (registered trademark) signal when the AV signal includes the signal belonging to Data Island defined in the HDMI (registered trademark) standard. On the other hand, the determining unit 120 determines that the AV signal is a DVI signal when the AV signal does not include a signal belonging to Data Island. Alternatively, the determining unit 120 determines that the AV signal is an HDMI (registered trademark) signal when the AV signal includes Guard Band which is a signal disposed before or after the signal belonging to Data Island defined in the HDMI (registered trademark) standard. On the other hand, the determining unit 120 may determine that the AV signal is a DVI signal when the AV signal does not include Guard Band. Alternatively, the determining unit 120 determines that the AV signal is an HDMI (registered trademark) signal when the AV signal includes AVI InfoFrame which is a signal (i) belonging to Data Island defined in the HDMI (registered trademark) standard and (ii) indicating the mode of the video represented by the AV signal. On the other hand, the determining unit 120 may determine that the AV signal is a DVI signal when the AV signal does not include AVI InfoFrame.

Figure 5:
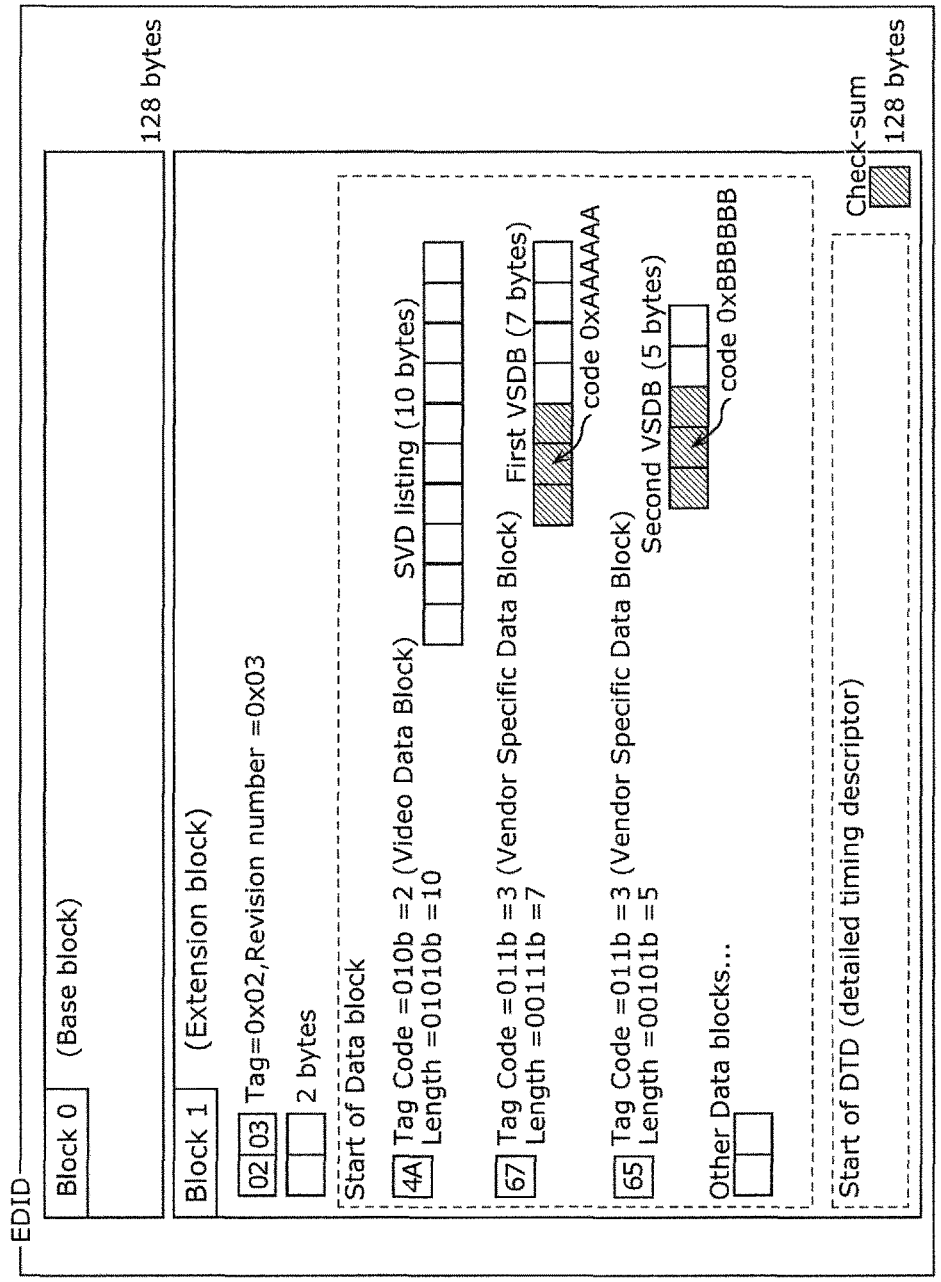
FIG. 5 is a diagram illustrating a structure of EDID according to the embodiment.

FIG. 5 is a diagram illustrating a structure of EDID.

The EDID includes a base block (Block 0) of 128 bytes and an extension block (Block 1) of 128 bytes.

The extension block includes a plurality of data blocks. More specifically, these data blocks are video data blocks and vendor-specific data blocks (VSDBs). Each video data block indicates a video format etc., and includes a short video descriptor (SVD) list of plural bytes. VSDB indicates a capability of the sink apparatus 100 defined by a vendor.

In addition, each data block includes, at its starting position, 1-byte information (hereinafter called as start information) indicating the type of the data block and the data size. The start information is configured with eight bits, and starting three of the eight bits indicate the type (Tag-Code) of the data block. In addition, the five bits subsequent to the starting three bits indicate the data size of the part (hereinafter referred to as subsequent information) subsequent to the start information in the data block.

For example, the start information indicated by "67" includes the starting three bits "011" and the five bits "00111" subsequent to the starting three bits. The starting three bits "011" indicates that the data block including the start information is VSDB. Furthermore, the five bits "00111" subsequent to the starting three bits indicates that the subsequent information included in the VSDB is seven bytes.

In addition, the start information indicated by "65" includes the starting three bits "011" and the five bits "00101" subsequent to the starting three bits. The starting three bits "011" indicates that the data block including the start information is VSDB. Furthermore, the five bits "00101" subsequent to the starting three bits indicates that the subsequent information included in the VSDB is five bytes.

In this way, the EDID may include a plurality of VSDBs, for example, a first VSDB including the start information "67", and a second VSDB including the start information "65". Here, the starting three bytes (24 bits) of the subsequent information of the VSDB indicates a code (hereinafter referred to as a vendor code) for identifying the vendor. The vendor code is an organizationally unique identifier (OUI) of IEEE, and indicates 0x0000C03 for example.

The vendor code may be modified even when the vendor code is assigned to the same vendor. For example, a vendor code "0xAAAAAA" assigned to a predetermined vendor is modified to a vendor code "0xBBBBBB". In such a case, as illustrated in FIG. 5, the EDID includes a plurality of VSDBs having different vendor codes. The first VSDB is an old VSDB before the modification, and the second VSDB is a new VSDB after the modification. Here, the subsequent information is analyzed based on the vendor code. Accordingly, when the vendor code is modified to the new vendor code, there is a case where the source apparatus 200 cannot correctly analyze the subsequent information of the new second VSDB even if the source apparatus 200 can correctly analyze the subsequent information of the old first VSDB before the modification. In this way, the source apparatus 200 which was not able to correctly analyze the subsequent information may transmit an AV signal as a DVI signal.

Figure 6:
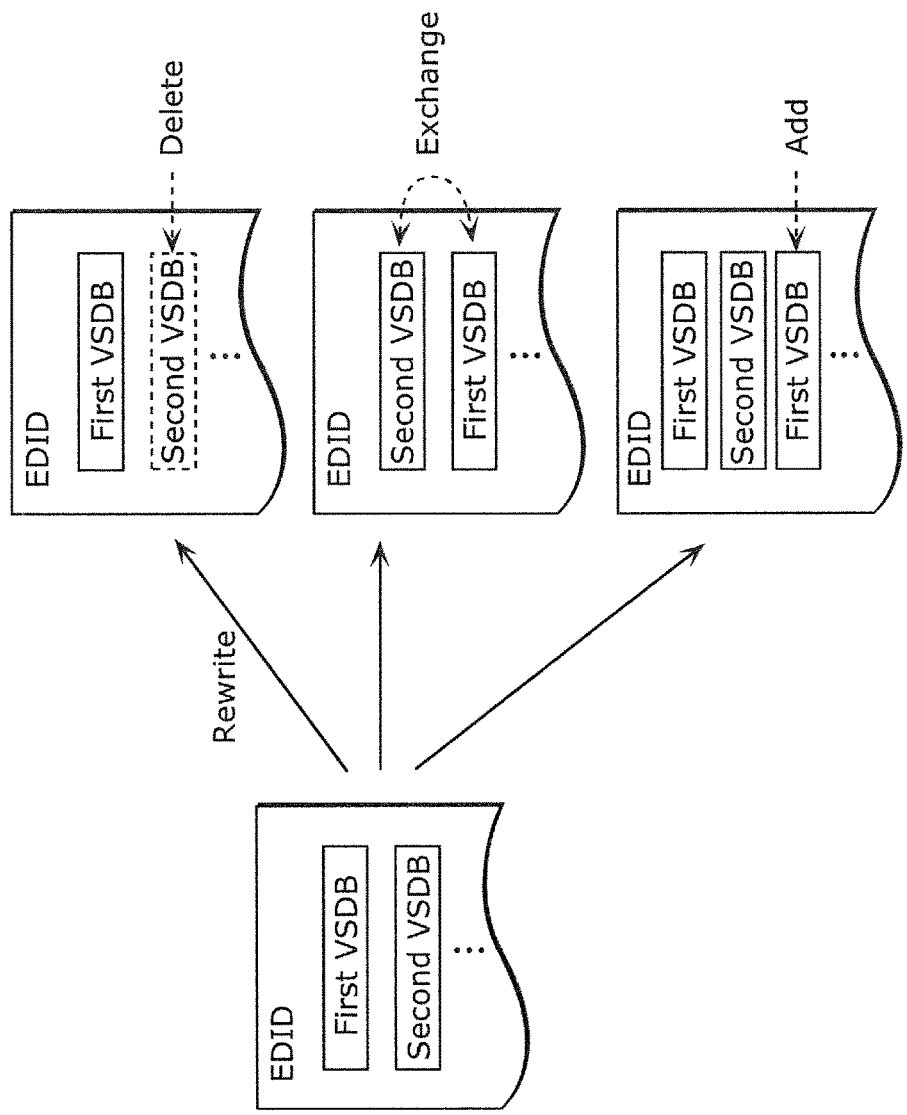
FIG. 6 is a diagram for illustrating examples of rewriting of EDID according to the embodiment.

FIG. 6 is a diagram for illustrating examples of rewriting of EDID.

When the rewriting unit 130 according to the embodiment rewrites EDID including a first VSDB and a second VSDB, the rewriting unit 130 deletes the second VSDB which includes a new vendor code as illustrated in FIG. 6. In this way, the source apparatus 200 can correctly analyze the EDID because the second VSDB including the new vendor code is not included in the EDID. As a result, the source apparatus 200 can transmit an AV signal according to the result of correctly analyzing the first VSDB, that is an HDMI (registered trademark) signal to the sink apparatus 100.

Alternatively, when the rewriting unit 130 rewrites the EDID, the rewriting unit 130 exchanges the positions of the first VSDB and the second VSDB included in the EDID. In other words, the rewriting unit 130 modifies the positions of the first VSDB and the second VSDB arranged in this listed order to the positions of the second VSDB and the first VSDB arranged in this listed order.

For example, the source apparatus 200 sequentially analyzes the plurality of data blocks included in the EDID according to the arrangement order of the data blocks in the EDID. At this time, in the case where the source apparatus 200 analyzes the latest data block while sequentially analyzing the plurality of data blocks of a same kind, the source apparatus 200 may keep only the result of analyzing the latest data block and discard the results of analyzing the previous data blocks.

However, as described above, when the positions of the first VSDB and the second VSDB arranged in this listed order are rewritten to the positions of the second VSDB and the first VSDB arranged in this listed order, the source apparatus 200 discards the result of analyzing the second VSDB. In other words, the result of erroneously analyzing the second VSDB including the new vendor code is discarded. In other words, the source apparatus 200 holds only the result of analyzing the first VSDB including the old vendor code, that is the result of correct analysis. Accordingly, the source apparatus 200 can transmit an AV signal according to the result of correctly analyzing the first VSDB, that is an HDMI (registered trademark) signal to the sink apparatus 100.

Alternatively, when the rewriting unit 130 rewrites the EDID, the rewriting unit further adds a new first VSDB to the EDID. In other words, the rewriting unit 130 writes the new first VSDB next to the second VSDB in the EDID in which the second VSDB is written next to the second VSDB.

Even in this case, likewise the exchange of the positions as described above, the source apparatus 200 discards the result of analyzing the second VSDB, and holds only the result of analyzing the first VSDB, that is the result of correct analysis. Accordingly, the source apparatus 200 can transmit an AV signal according to the result of correctly analyzing the first VSDB, that is an HDMI (registered trademark) signal to the sink apparatus 100.

The rewriting unit 130 rewrites part of the EDID in the above example, but it may rewrite the entire EDID.

Figure 7:
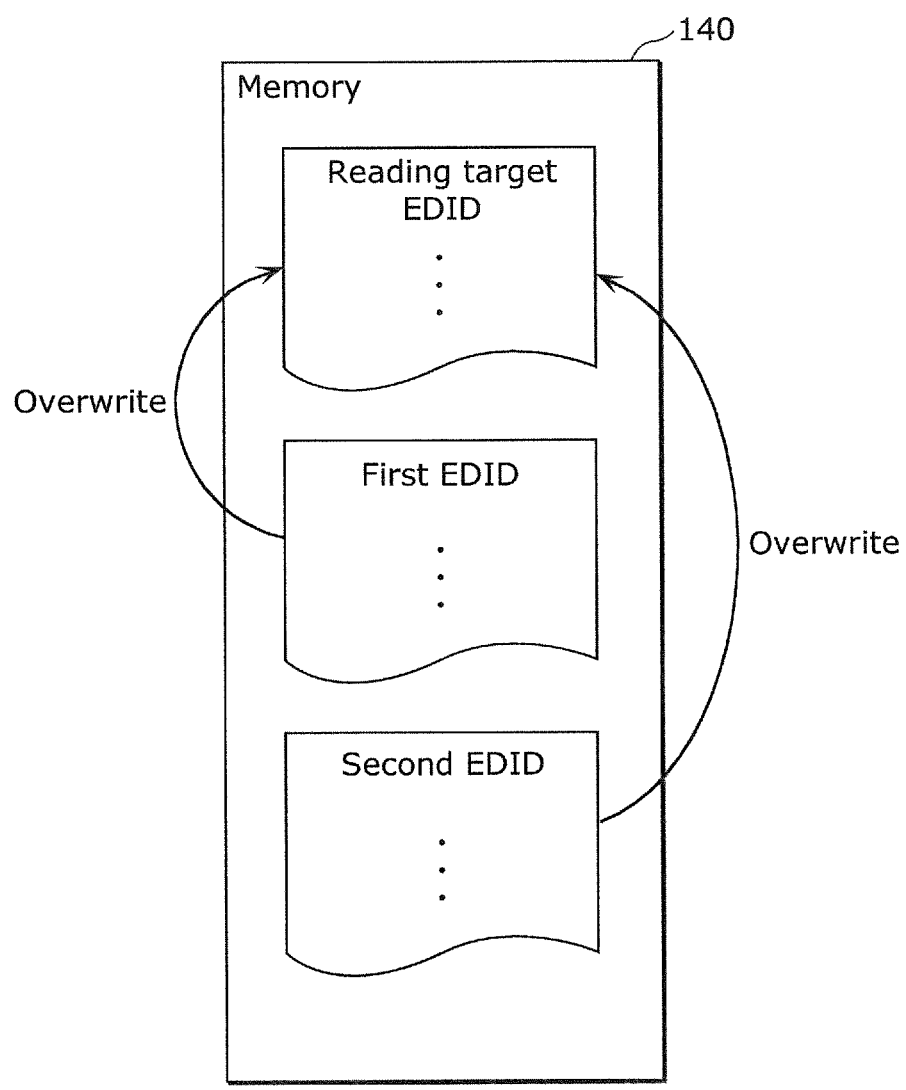
FIG. 7 is a diagram for illustrating other examples of rewriting of EDID according to the embodiment.

FIG. 7 is a diagram for illustrating examples of rewriting of EDID.

Data area read by the source apparatus 200 is an area ranging from 0th byte to 255th byte in a recording area of the memory 140. In other words, the source apparatus 200 never reads data in an area starting from 256th byte in the memory 140. In view of this, the memory 140 may hold reading target EDID in the area ranging from 0th byte to 255th byte in the recording area, and hold the first EDID and the second EDID in the area starting from 256th byte.

For example, the first EDID is EDID including a first VSDB and a second VSDB, and the second EDID is EDID including only first VSDBs, among the first VSDB and the second VSDB. Alternatively, the positions of the first VSDBs and the second VSDB vary between the first EDID and the second EDID. Alternatively, the first EDID is EDID including VSDBs which are a first VSDB and a second VSDB arranged in this listed order, and the second EDID is EDID including VSDBs which are a first VSDB, a second VSDB, and a first VSDB arranged in this listed order.

In this case, when the rewriting unit 130 according to the embodiment rewrites the EDID, the rewriting unit 130 overwrites one of the first EDID and the second EDID on reading target EDID so as to rewrite the reading target EDID. The reading target EDID is either the first EDID or the second EDID. When the reading target EDID is the first EDID, the rewriting unit 130 rewrites the reading target EDID which is the first EDID to the second EDID. On the other hand, when the reading target EDID is the second EDID, the rewriting unit 130 rewrites the reading target EDID which is the second EDID to the first EDID.

In addition, when the rewriting is performed, the first EDID and the second EDID are always held in the memory 140. Accordingly, the rewriting unit 130 can return the rewritten reading target EDID back to the EDID (either first EDID or the second EDID) before the rewriting. The EDID which has been rewritten may be returned back to the EDID before the rewriting at any timing. Alternatively, it is also good to maintain the EDID which has been rewritten, without returning it back to the EDID before the rewriting.

[3. Operations]

Figure 8:
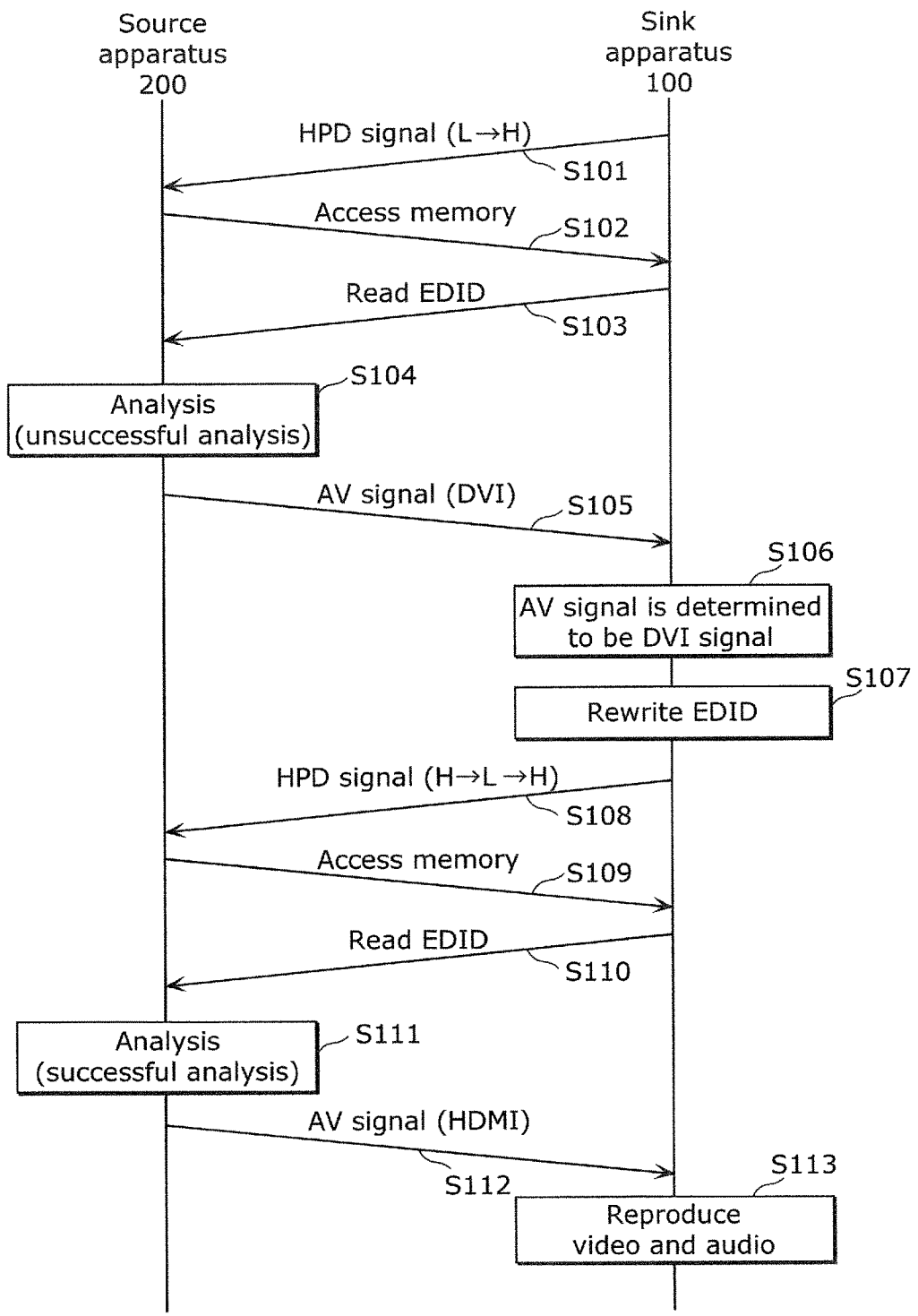
FIG. 8 is a sequence diagram of operations performed in the AV signal transmission and receiving system according to the embodiment.

FIG. 8 is a sequence diagram of operations performed in the AV signal transmission and receiving system 10 according to the embodiment.

First, the sink apparatus 100, when it is connected to the source apparatus 200 via an HDMI (registered trademark) cable 300, switches the output level of an HPD signal from Low to High (Step S101). When the source apparatus 200 recognizes that the output level of the HPD signal has changed from Low to High, the source apparatus 200 accesses the memory 140 of the sink apparatus 100 (Step S102). Subsequently, the source apparatus 200 reads the EDID held in the memory 140 (Step S103). It is to be noted that Step S103 is a reading step in which the source apparatus 200 reads the EDID which is data indicating a capability of the sink apparatus 100 from the sink apparatus 100 via the HDMI (registered trademark) cable 300.

Next, the source apparatus 200 analyzes the EDID (Step S104) which has been read. It is to be noted that Step S104 is an analyzing step in which the source apparatus 200 analyzes the EDID which has been read. At this time, in the case where the source apparatus 200 was not able to correctly analyze the EDID, the source apparatus 200 transmits an AV signal as a DVI signal to the sink apparatus 100 (Step S105). It is to be noted that Step S105 is a transmitting step in which the source apparatus 200 transmits the AV signal according to the result of analyzing the EDID to the sink apparatus 100 via the HDMI (registered trademark) cable 300.

When the sink apparatus 100 receives the AV signal from the source apparatus 200, the sink apparatus 100 determines that the AV signal is a DVI signal (Step S106). It is to be noted that Step S106 includes a receiving step and a determining step. In the receiving step, the sink apparatus 100 receives the AV signal via the HDMI (registered trademark) cable 300. In the determining step, the sink apparatus 100 determines whether the received AV signal is either an HDMI (registered trademark) signal conforming to the HDMI (registered trademark) standard or a DVI signal conforming to the DVI standard. As described above, in Step S106, the sink apparatus 100 determines that the AV signal is a DVI signal.

At this time, the sink apparatus 100 starts reproducing video represented by the received DVI signal. Subsequently, after an elapse of a predetermined period from when the determination in Step S106 was made, the sink apparatus 100 rewrites the EDID (the above-described reading target EDID) held in the memory 140 (Step S107). It is to be noted that this Step S107 is a rewriting step in which the sink apparatus 100 rewrites the EDID which has been read and held in the memory of the sink apparatus 100 when the sink apparatus 100 determines that the AV signal is a DVI signal.

The sink apparatus 100 changes the output level of the HPD signal when the rewriting of the reading target EDID is completed. In other words, the sink apparatus 100 returns the output level of the HPD signal from High back to Low, and then further switches from Low to High (Step S108). It is to be noted that Step S108 is an HPD control step in which the sink apparatus 100 outputs a hot plug detect (HPD) signal indicating that the EDID which has been rewritten can be read to the source apparatus 200 via the HDMI (registered trademark) cable 300.

In this way, the HPD signal indicating that the reading of the EDID which has been rewritten is possible is output to the source apparatus 200.

When the source apparatus 200 recognizes that the output level of the HPD signal has changed from Low to High, the source apparatus 200 accesses the memory 140 of the sink apparatus 100 (Step S109). Subsequently, the source apparatus 200 reads the EDID held in the memory 140, that is the reading target EDID which has been rewritten (Step S110).

Next, the source apparatus 200 analyzes the EDID which has been read (Step S111). Here, when the source apparatus 200 was able to correctly analyze the EDID, the source apparatus 200 transmits the AV signal as the HDMI (registered trademark) signal to the sink apparatus 100 (Step S112).

When the sink apparatus 100 receives the AV signal from the source apparatus 200, the sink apparatus 100 determines that the AV signal is an HDMI (registered trademark) signal, and reproduces at least one of video and audio represented by the AV signal (Step S113). In other words, the sink apparatus 100 changes the reproduction of video represented by the DVI signal to reproduction of video or audio represented by the HDMI (registered trademark) signal.

Figure 9:
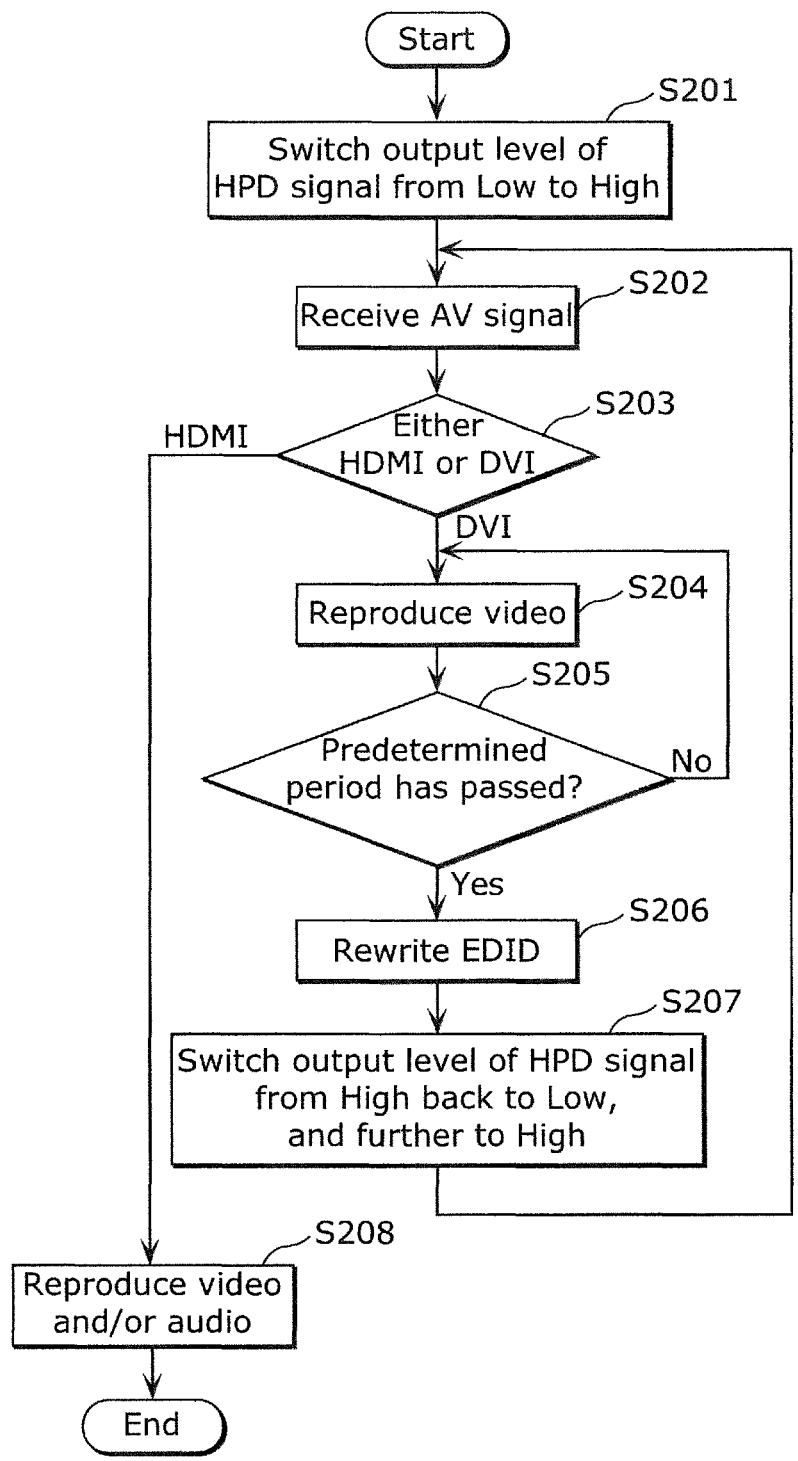
FIG. 9 is a flowchart indicating operations performed by the sink apparatus according to the embodiment.

FIG. 9 is a flowchart indicating operations performed by the sink apparatus 100 according to the embodiment.

The sink apparatus 100 firstly switches the output level of the HPD signal from Low to High (Step S201). Subsequently, the sink apparatus 100 receives the AV signal via the HDMI (registered trademark) cable 300 (a receiving step S202). At this time, the sink apparatus 100 determines whether the received AV signal is an HDMI (registered trademark) signal or a DVI signal (a determining step S203). Here, when the sink apparatus 100 determines that the received AV signal is an HDMI (registered trademark) signal (the HDMI (registered trademark) in the determining step S203), the sink apparatus 100 reproduces at least one of the video and audio represented by the AV signal (Step S208).

On the other hand, when the sink apparatus 100 determines that the received AV signal is a DVI signal (the DVI in the determining step S203), the sink apparatus 100 reproduces the video represented by the DVI signal (Step S204). Subsequently, the sink apparatus 100 determines whether the previously determined period (predetermined period) has passed from when the AV signal was determined to be the DVI signal (Step S205). Here, when the sink apparatus 100 determines that the predetermined period has not yet passed (No in Step S205), the sink apparatus 100 keeps reproducing the video represented by the DVI signal until the predetermined period elapses (Step S204). On the other hand, when the sink apparatus 100 determines that the predetermined period has passed (Yes in Step S205), the sink apparatus 100 rewrites the EDID (a rewriting step S206). Subsequently, the sink apparatus 100 returns the output level of the HPD signal from High back to Low, and further switches the output level from Low to High (a HPD control step S207).

[4. Effects]

As described above, the AV signal transmission and receiving system 10 includes the source apparatus 200 and the sink apparatus 100 connected to the source apparatus 200 via the HDMI (registered trademark) cable 300. The source apparatus 200 includes an EDID reading unit 230, an EDID analyzing unit 240, an AV signal transmission unit 210, and a control unit 220. The EDID reading unit 230 reads EDID which is data indicating a capability of the sink apparatus 100 from the sink apparatus 100 via the HDMI (registered trademark) cable 300. The EDID analyzing unit 240 analyzes the read EDID. The AV signal transmission unit 210 transmits the AV signal to the sink apparatus 100 via the HDMI (registered trademark) cable 300. The control unit 220 instructs the AV signal transmission unit 210 to transmit the AV signal according to the result of analyzing the EDID. Furthermore, the control unit 220 instructs the EDID reading unit 230 to read the EDID according to the HPD signal received from the sink apparatus 100 via the HDMI (registered trademark) cable 300. In addition, the sink apparatus 100 includes the AV signal receiving unit 110, the memory 140, the rewriting unit 130, the HPD control unit 150, and the determining unit 120. The AV signal receiving unit 110 receives the AV signal via the HDMI (registered trademark) cable 300. The memory 140 holds the EDID. The rewriting unit 130 rewrites the EDID held in the memory 140. The HPD control unit 150 controls output of an HPD signal. The determining unit 120 determines whether the received AV signal is either an HDMI (registered trademark) signal conforming to the HDMI (registered trademark) standard or a DVI signal conforming to the DVI standard. When the determining unit 120 determines that the AV signal is a DVI signal, the determining unit 120 instructs the rewriting unit 130 to rewrite the EDID held in the memory 140. Furthermore, the determining unit 120 instructs the HPD control unit 150 to output an HPD signal indicating that reading of the EDID which has been rewritten is possible.

In this way, in an example case where the source apparatus 200 was not able to correctly analyze the EDID and transmitted the AV signal as the DVI signal, rewriting of the EDID and reading of the EDID which has been rewritten are executed. In other words, the EDID is rewritten by the sink apparatus 100, and the reading of the EDID which has been rewritten is executed by the source apparatus 200. As a result, in the case where the source apparatus 200 was able to correctly analyze the EDID which has been rewritten, it is possible to cause the source apparatus 200 to transmit the AV signal as the HDMI (registered trademark) signal not as the DVI signal. In this way, the sink apparatus 100 can receive the AV signal appropriately.

For example, the determining unit 120 determines that the AV signal is an HDMI (registered trademark) signal when the AV signal includes a signal belonging to Data Island defined in the HDMI (registered trademark) standard. On the other hand, the determining unit 120 determines that the AV signal is a DVI signal when the AV signal does not include a signal belonging to Data Island.

In this way, the sink apparatus 100 can appropriately determine whether the AV signal is the HDMI (registered trademark) signal or the DVI signal.

Alternatively, the determining unit 120 determines that the AV signal is an HDMI (registered trademark) signal when the AV signal includes Guard Band which is a signal disposed before or after a signal belonging to Data Island defined in the HDMI (registered trademark) standard. On the other hand, the determining unit 120 may determine that the AV signal is a DVI signal when the AV signal does not include Guard Band.

Also in this way, the sink apparatus 100 can appropriately determine whether the AV signal is the HDMI (registered trademark) signal or the DVI signal.

Alternatively, the determining unit 120 determines that the AV signal is an HDMI (registered trademark) signal when the AV signal includes AVI InfoFrame which is a signal (i) belonging to Data Island defined in the HDMI (registered trademark) standard and (ii) indicating the mode of the video represented by the AV signal. On the other hand, the determining unit 120 may determine that the AV signal is a DVI signal when the AV signal does not include AVI InfoFrame.

Also in this way, the sink apparatus 100 can appropriately determine whether the AV signal is the HDMI (registered trademark) signal or the DVI signal.

In addition, as illustrated in FIG. 7, the memory 140 may hold reading target EDID which is EDID to be read by the source apparatus 200, and hold first EDID and second EDID. The first EDID includes a single VSDB including a code for identifying a predetermined organization, defined by the HDMI (registered trademark) standard. The second EDID includes a plurality of VSDBs each including a different code for identifying a predetermined organization. In this case, the rewriting unit 130 rewrites the reading target EDID indicating the same content as the content of one of the first EDID and the second EDID into the content of the other one of the first EDID and the second EDID.

In this way, it is possible to rewrite the reading target EDID into the first EDID or the second EDID. In other words, it is possible to switch the EDID to be read between the first EDID and the second EDID.

Here, the rewriting unit 130 may rewrite the reading target EDID indicating the same content as the content of the second EDID into first EDID.

In this way, the reading target EDID including the two VSDBs can be switched to the first EDID which includes only a single VSDB. Thus, it is possible to prevent or reduce an error of analysis of EDID by the source apparatus 200, and the sink apparatus 100 can appropriately receive the AV signal. In addition, the second EDID is written into the memory, as an initial value of the reading target EDID. Accordingly, if the source apparatus 200 has a high application capability, the source apparatus 200 can transmit, for example, an AV signal according to the latest capability or function of the sink apparatus 100 to the sink apparatus 100.

In addition, the first EDID may include a plurality of VSDBs each including a different code for identifying a predetermined organization, defined by the HDMI (registered trademark) standard. In this case, the second EDID includes a plurality of VSDBs arranged in an order different from the order of a plurality of VSDBs which are arranged in the first EDID. Subsequently, the rewriting unit 130 rewrites the reading target EDID which indicates the same content as the content of one of the first EDID and the second EDID into the other one of the first EDID and the second EDID.

Even in this case, it is possible to rewrite the reading target EDID into the first EDID or the second EDID. In other words, it is possible to switch the EDID to be read between the first EDID and the second EDID. In addition, switching to one of the first EDID and the second EDID prevents or reduces an error of analysis of the EDID by the source apparatus 200, and thus the sink apparatus 100 can appropriately receive the AV signal.

In addition, when the determining unit 120 determines that the AV signal is a DVI signal, the determining unit 120 determines whether a predetermined period has passed from when the determination was made. When the determining unit 120 determines that the predetermined period has passed, the determining unit 120 may instruct the rewriting unit 130 to rewrite the EDID.

In this way, when the AV signal configured as a DVI signal is received by the sink apparatus 100, the sink apparatus 100 displays a video represented by the DVI signal. However, when rewriting and reading of the EDID is performed immediately after the time when the AV signal was determined to be the DVI signal, the displayed video is immediately switched to the video represented by the HDMI (registered trademark) signal. Accordingly, such switching makes a viewer of the sink apparatus 100 feel strange. In view of this, as described above, rewriting the EDID after an elapse of a predetermined period from when the determination was made makes it possible to reduce the strangeness and cause the source apparatus 200 to operate stably.

In addition, when the determining unit 120 determines that the AV signal is a DVI signal, the determining unit 120 may cause the HPD control unit 150 to lower the level of the HPD signal to be output from High to Low and then raise the level to High. As a result, the determining unit 120 causes the HPD control unit 150 to output the HPDP signal indicating that reading of the EDID which has been rewritten is possible to the source apparatus 200.

In this way, modifying the level of the HPD signal makes it possible to cause the source apparatus 200 to read the EDID which has been rewritten, and thus it is possible to cause the source apparatus 200 to easily transmit the AV signal, based on the EDID which has been rewritten.

It is to be noted that the whole or a part of each of the sink apparatus 100 and the source apparatus 200 according to the embodiment may be configured with an integrated circuit, a microprocessor, or a microcomputer. For example, a unit including a control unit 220, an EDID reading unit 230, and an EDID analyzing unit 240 is configured with a microprocessor in the source apparatus 200. In addition, a unit including a determining unit 120, a rewriting unit 130, and an HPD control unit 150 is configured with a microprocessor in the sink apparatus 100. In addition, each of operations performed by the sink apparatus 100 and the source apparatus 200 may be executed by means of the microprocessor reading a computer program.

Embodiment 1 has been described above as the example of the technique disclosed in the present application. For illustrative purposes only, the attached drawings and the detailed embodiments have been provided.

Accordingly, the constituent elements described in the attached drawings and the detailed embodiments include elements inessential for solving problems but for illustrative purposes only, in addition to elements essential for solving problems. Accordingly, the fact that the inessential constituent elements are described in the attached drawings and the detailed embodiments should not be directly relied upon as a basis for regarding that the inessential constituent elements are essential.

Since the above embodiment is provided as an example for explaining the technique in the present disclosure, various kinds of modification, replacement, addition, omission, etc. can be performed within the scope of the claims and the equivalents thereof.

INDUSTRIAL APPLICABILITY

The present disclosure is applicable to AV signal transmission and receiving systems etc. capable of appropriately receiving an AV signal. More specifically, for example, the present disclosure is applicable to AV signal transmission and receiving systems etc. including a source apparatus such as a DVD player or a BD recorder and a sink apparatus such as a TV receiver.

REFERENCE SIGNS LIST

10 AV signal transmission and receiving system
100 Sink apparatus
110 AV signal receiving unit
120 Determining unit
130 Rewriting unit
140 Memory
150 HPD control unit
200 Source apparatus
210 AV signal transmission unit
220 Control unit
230 EDID reading unit
240 EDID analyzing unit
300 HDMI (registered trademark) cable

The invention claimed is:

1. An AV signal transmission and receiving system comprising:
a source apparatus; and
a sink apparatus connected to the source apparatus via a high-definition multimedia interface (HDMI) (registered trademark) cable,
wherein the source apparatus includes:
a reading unit configured to read extended display identification data (EDID) from the sink apparatus via the HDMI (registered trademark) cable, the EDID being data indicating a capability of the sink apparatus;
an analyzing unit configured to analyze the EDID which has been read;
a transmission unit configured to transmit an AV signal to the sink apparatus via the HDMI (registered trademark) cable; and
a control unit configured to instruct the transmission unit to transmit the AV signal according to a result of analyzing the EDID, and instruct the reading unit to read the EDID according to a hot plug detect (HPD) signal which is received from the sink apparatus via the HDMI (registered trademark) cable, and
wherein the sink apparatus includes:
a receiving unit configured to receive the AV signal via the HDMI (registered trademark) cable;
a memory which holds the EDID;
a rewriting unit configured to rewrite the EDID held in the memory;
an HPD control unit configured to control output of the HPD signal; and
a determining unit configured to:
determine whether the AV signal which has been received is an HDMI (registered trademark) signal conforming to an HDMI (registered trademark) standard or a digital visual interface (DVI) signal conforming to a DVI standard; and
when the determining unit determines that the AV signal is a DVI signal, instruct the rewriting unit to rewrite the EDID held in the memory, and instruct the HPD control unit to output the HPD signal indicating that reading of the EDID which has been rewritten is possible.

2. The AV signal transmission and receiving system according to claim 1,
wherein the determining unit is configured to:
determine that the AV signal is an HDMI (registered trademark) signal when the AV signal includes a signal belonging to Data Island defined in the HDMI (registered trademark) standard; and
determine that the AV signal is a DVI signal when the AV signal does not include a signal belonging to the Data Island.

3. The AV signal transmission and receiving system according to claim 1,
wherein the determining unit is configured to:
determine that the AV signal is an HDMI (registered trademark) signal when the AV signal includes Guard Band which is a signal disposed before or after a signal belonging to Data Island defined in the HDMI (registered trademark) standard; and
determine that the AV signal is a DVI signal when the AV signal does not include Guard Band.

4. The AV signal transmission and receiving system according to claim 1,
wherein the determining unit is configured to:
determine that the AV signal is an HDMI (registered trademark) signal when the AV signal includes AVI InfoFrame which is a signal indicating a mode of video which is presented by the AV signal, AVI InfoFrame being a signal belonging to Data Island defined in the HDMI (registered trademark) standard; and
determine that the AV signal is a DVI signal when the AV signal does not include AVI InfoFrame.

5. The AV signal transmission and receiving system according to claim 1, wherein the memory:
  holds a reading target EDID which is the EDID to be read by the source apparatus; and
  holds first EDID including only a single vendor-specific data block (VSDB) including a code for identifying a predetermined organization, and a second EDID including a plurality of VSDBs each including a different code for identifying a predetermined organization, the VSDB being defined in the HDMI (registered trademark) standard, and
  the rewriting unit is configured to rewrite the reading target EDID indicating same content as content of one of the first EDID and the second EDID to the other one of the first EDID and the second EDID.

6. The AV signal transmission and receiving system according to claim 5,
  wherein the rewriting unit is configured to rewrite the reading target EDID indicating the same content as the content of the second EDID into the first EDID.

7. The AV signal transmission and receiving system according to claim 1,
  wherein the memory:
    holds a reading target EDID which is the EDID to be read by the source apparatus; and
    holds first EDID including a plurality of vendor-specific data blocks (VSDBs) each including a different code for identifying a predetermined organization, and a second EDID including the plurality of VSDBs arranged in an order different from an order of the plurality of VSDBs arranged in the first EDID, the VSDB being defined in the HDMI (registered trademark) standard, and
    the rewriting unit is configured to rewrite the reading target EDID indicating same content as content of one of the first EDID and the second EDID to the other one of the first EDID and the second EDID.

8. The AV signal transmission and receiving system according to claim 1,
  wherein, when the determining unit determines that the AV signal is a DVI signal, the determining unit is configured to determine whether a predetermined period has passed from when the determination was made, and upon determining that the predetermined period has passed, the determining unit is configured to instruct the rewriting unit to rewrite the EDID.

9. The AV signal transmission and receiving system according to claim 1,
  wherein, when the determining unit determines that the AV signal is a DVI signal, the determining unit is configured to cause the HPD control unit to lower a level of the HPD signal to be output from High to Low, and then raise the level back to High, and thereby cause the HPD control unit to output, to the source apparatus, the HPD signal indicating that reading of the EDID which has been rewritten is possible.

10. A sink apparatus which is connected to a source apparatus via a high definition multimedia interface (HDMI) (registered trademark) cable, the sink apparatus comprising:
  a receiving unit configured to receive an AV signal transmitted from the source apparatus via the HDMI (registered trademark) cable;
  a memory which holds extended display identification data (EDID) which is data indicating a capability of the sink apparatus;
  a rewriting unit configured to rewrite the EDID held in the memory;
  an HPD control unit configured to control output of a hot plug detect (HPD) signal to the source apparatus via the HDMI (registered trademark) cable; and
  a determining unit configured to:
    determine whether the AV signal which has been received is an HDMI (registered trademark) signal conforming to an HDMI (registered trademark) standard or a digital visual interface (DVI) signal conforming to a DVI standard; and
    when the determining unit determines that the AV signal is a DVI signal, instruct the rewriting unit to rewrite the EDID held in the memory, and instruct the HPD control unit to output the HPD signal indicating that reading of the EDID which has been rewritten is possible.

11. An AV signal transmission and receiving method for transmitting and receiving an AV signal between a source apparatus and a sink apparatus connected to the source apparatus via a high-definition multimedia interface (HDMI) (registered trademark) cable, the AV signal transmission and receiving method comprising:
  reading extended display identification data (EDID) from the sink apparatus via the HDMI (registered trademark) cable, the EDID being data indicating a capability of the sink apparatus, the reading being performed by the source apparatus;
  analyzing the EDID which has been read, the analyzing being performed by the source apparatus;
  transmitting an AV signal according to a result of analyzing the EDID to the sink apparatus via the HDMI (registered trademark) cable, the transmitting being performed by the source apparatus;
  receiving the AV signal via the HDMI (registered trademark) cable, the receiving being performed by the sink apparatus;
  determining whether the AV signal which has been received is an HDMI (registered trademark) signal conforming to an HDMI (registered trademark) standard or a digital visual interface (DVI) signal conforming to a DVI standard, the determining being performed by the sink apparatus;
  rewriting the EDID held in a memory of the sink apparatus and already read, when the AV signal is determined to be a DVI signal by the sink apparatus, the rewriting being performed by the sink apparatus; and
  outputting a hot plug detect (HPD) signal indicating that reading of the EDID which has been rewritten is possible to the source apparatus via the HDMI (registered trademark) cable, the outputting being performed by the sink apparatus.

12. An AV signal receiving method for receiving an AV signal from a source apparatus via a high-definition multimedia interface (HDMI) (registered trademark) cable, the AV signal receiving method comprising:
  receiving the AV signal via the HDMI (registered trademark) cable;
  determining whether the AV signal which has been received is an HDMI (registered trademark) signal conforming to an HDMI (registered trademark) standard or a digital visual interface (DVI) signal conforming to a DVI standard;
  rewriting an extended display identification data (EDID) held in a memory and already read, when the AV signal is determined to be a DVI signal; and
  outputting a hot plug detect (HPD) signal indicating that reading of the EDID which has been rewritten is possible to the source apparatus via the HDMI (registered trademark) cable.

* * * * *